United States Patent [19]

Rodriguez

[11] Patent Number: 5,042,337
[45] Date of Patent: Aug. 27, 1991

[54] CABLE SHEAR

[76] Inventor: Alan Rodriguez, 3025 Montego, Plano, Tex. 75023

[21] Appl. No.: 396,341

[22] Filed: Aug. 21, 1989

[51] Int. Cl.$^5$ ............................. B26D 1/00; B26D 3/16
[52] U.S. Cl. ............................................. 83/13; 30/95; 30/228; 83/199; 83/907
[58] Field of Search ................ 30/95, 206, 228, 240, 30/247; 83/199, 907, 13

[56] References Cited
U.S. PATENT DOCUMENTS
1,216,426  2/1917  Erickson ............................. 83/199

Primary Examiner—Douglas D. Watts
Attorney, Agent, or Firm—Johnson & Gibbs

[57] ABSTRACT

A shearing device for wire rope or cables. The device incorporates a shear block system having a first cylindrical block adapted for mainly engaging an eccentric recess formed in a housing. Both the housing and the block are constructed with apertures therethrough adapted for receiving the cable or wire rope therein. Eccentric misalignment of the apertures is provided by relative rotation between the housing and the block to therein provide the shearing action. In this manner, a post-tension cable of the type utilized in concrete construction or the like, can be terminated within a recessed region with efficiency and dimensional control.

16 Claims, 2 Drawing Sheets

CABLE SHEAR

BACKGROUND OF THE INVENTION

1. Field of the Invention

The present invention relates to cable shearing devices and, more particularly, to apparatus for cutting a cable or wire rope of the type utilized in concrete construction.

2. History of the Prior Art

The prior art is replete with concrete construction cable tensioning systems. These systems include both pre-stressed and post-tensioned cables and wire rope. Engineering in the post-tensioning of concrete is a well developed technology and the utilization of such tendons extending through a concrete slab or beam is conventional. The tendons provide structural strength for the concrete in a manner and at a cost not heretofore possible with conventional rebar construction. Utilization of such tendons does, however, require anchor assemblies on opposite ends thereof and the termination of the cable itself at the anchors. The anchor assembly secures the ends of the terminated tendons extending through the concrete bed whereby the tendons remain taut and effective during the life-span of the construction. The effectiveness requires the protection of the terminated tendons, which are usually made of steel or the like, from corrosion. Corrosive forces are well known to cause deterioration in the strength of the concrete if allowed to jeopardize the integrity of tensioning member. To prevent corrosion of the tendon, the steel fibers are usually sheathed in a plastic membrane throughout the length of the slab. The membranes do, however, require termination at the point where the tendons are secured within the anchor assemblies. The reason is obviously to provide appropriate structural integrity at the secured position.

In the process of post-tensioning, it is important that the tendon is free to move within the hardened concrete so that the tensile load on the tendon is evenly distributed along the entire length of the structure. Methods used to insure that the tendons provide free movement within the hardened concrete include laying a number of strands of wire in a sheath. It is within this sheath that the strands of wire are stressed after the concrete is hardened. After stressing, the wires exposed from the ends of the anchor assemblies are then cut-off or terminated. Just the opposite is true of pre-stressing concrete cables. With such cables, they are first stretched and exposed to the concrete during pouring. They are not covered with a protective sheath due to the fact that it is important that the concrete bond directly to the exposed, taut cable in its pre-stressed condition. Once the forms are set the tension in the cable is also established so that as the concrete cures it forms a bond directly to the cable and no cable movement is allowed without movement in the concrete itself. There are, of course, advantages to both systems depending on the type of fabrication utilized in the ultimate application.

The present invention pertains to terminating the tensioning cable at the anchor assemblies utilized in post-tensioning configurations. Pre-stressing configurations do not necessarily require such elaborate anchor assemblies and the associated termination problem because the cables are cemented in the concrete and can simply be cut off during the form removal process. The present invention could, however, be useful in cutting such cable assemblies. Post-tensioning incorporates a duct or plastic tube as described above and the utilization of wedges or anchors on opposite ends to produce the tensile force transmitted through the mono or multi-strand cable. Since the force has to be applied after the concrete has cured up to a point, the tensioning must occur after pouring and the cable termination must occur subsequent thereto. Problems associated therewith are obviously the problem of terminating a cable that has been critically secured in a wedged configuration. The securement must not be effected during cutting and the cable must be left in a condition that does not jeopardize the integrity of the system. However, in many instances this "cutting" is completed by the utilization of a cutting torch, which, by definition, effects the cable, the wedges and the surrounding surfaces with intense heat.

A post-tensioned cable is not easily terminated. The cable is generally recessed within a pocket in the poured concrete and it is extremely difficult to obtain access to the cable with any cutting implement other than a cutting torch. The primary problem with cutting torches is the fact that the flame creates an intense heat that anneals the cable and the wedges which are used for locking the tensioned cable in place. Moreover, the degree of accuracy of a torch flame is limited. Annealing alone can very often cause ultimate failure of the tensioning system. In addition, the torch heat enhances the corrosive action of any moisture exposed to the terminated cables. It is well known that intense heat enhances corrosive forces and, as set forth above, it is critical that the cable be protected against corrosion. Most often, this is effected by enclosing the terminated cable or tendon, as it may be called, in a plastic coating or cup. Such a covering requires some exactitude in the cutting configuration so that a precise length is provided at the termination point. With torches and the like, the damage as well as the inaccuracies are manifest in many failures and costly mistakes.

The present invention provides an advantage over the prior art by providing a method of and apparatus for precise shearing of wire rope and cables in general, and post-tensioning cables in particular. The apparatus is designed to be matingly inserted into the recess or pocket of a post-tension formation area around the tendon. A precise cold shear of the cable is then effected. The cold shear cut is accomplished by the utilization of eccentric apertures in relatively small interlocking blocks which may be received directly within the formation pocket or recess. One block is generally cylindrical in shape and it is constructed with an aperture therethrough in an eccentric location therein. Another block is provided with an aperture formed centrally therethrough for receiving the cable to be terminated. Rotation of the cylindrical block relative to the other block thus produces shear forces that cut the cable at a precise location without the damaging effects of heat and the like. In this manner the great advantage over prior art systems is afforded in an economically feasible configuration.

Summary of the Invention

The present invention pertains to shearing devices and methods for termination of post-tensioning cables. More particularly, one aspect of the invention comprises a shear block system of the type constructed for receipt of a tensioning tendon therein and the termination of the tendon by rotation of the blocks. A first cylindrical block is thus constructed for rotational mounting within a second block, and both are adapted for receiving the cable therethrough. The second block has a central aperture formed therein of a size sufficient for easily receiving the cable. The first cylindrical block likewise contains an aperture of generally equivalent size but in an eccentric location. Rotation of the cylindrical block relative to the second block effects total misalignment of the apertures. The misalignment therein terminates the cable which is pinched therebetween and sheared thereacross. A shear back-up member may be utilized to maintain the axial forces required to secure the engagement of the first and second blocks during the shearing operation and means are provided for rotating the first block relative to the second.

In another aspect, the invention includes a shear block assembly for the cold shear of a tendon. The assembly comprises a housing having an eccentrically positioned recess formed therein with an aperture formed therethrough. A generally cylindrical block is adapted for being received within the recess and having an aperture formed therethrough adapted for positioning in registry with the aperture of the housing in a first positionable mode. Means are provided for imparting relative rotation between the block and the housing whereby the aperture of the block may be positioned out of registry with the aperture of the housing in a second positionable mode. Means are also provided for maintaining the axial relationship between the block and the housing during the relative rotation therebetween. This results in a cold shear of the tendon extending through the apertures thereof whereby the tendon may be terminated at a select location therealong.

Brief Description of the Drawings

For a more complete understanding of the present invention and for further objects and advantages thereof, reference may now be had to the following description taken in conjunction with the accompanying drawings in which.

Detailed Description

Figure 1:
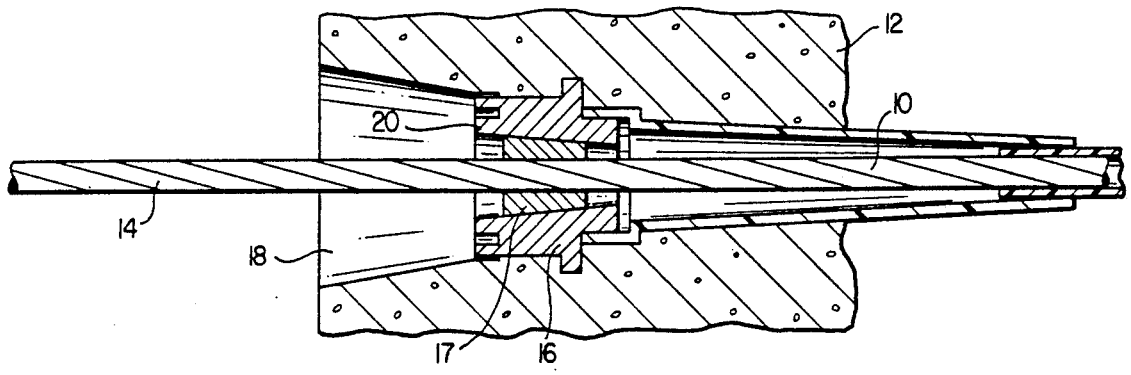
FIG. 1 is a side-elevational, cross-sectional view of an anchor plate assembly and post-tensioning cable extending outwardly from a concrete formation.

Referring first to FIG. 1 there is shown a tensioning cable 10 received within a concrete structure 12 for reinforcement thereof. A cable section 14 extends outwardly of the concrete structure 12 and is secured therein by an anchor plate assembly 16, including securement wedges 17. The assembly 16 is secured within the concrete formation 12 with a pocket 18 formed outwardly thereof. This is a typical construction of a tensioning cable as shown in co-pending patent application Ser. No. 7/088,795, the inventor Of which is the applicant of the present application. As shown in that patent application, the assembly 16 has an outer face 20 that is exposed to the external cable 14. It is the cable 14 extending outwardly from the face 20 that must be terminated and removed from the pocket 18 in order to permit the remaining cable 10 to be sealed and secured within a protective cover or a grout plug (not shown) for purposes of preventing corrosion and to facilitate structural integrity of the assembly. The various elements shown in FIG. 1 which make up the wedge assembly 16 and/or cable sheath with assembly 16 is described in more detail in the aforesaid co-pending patent application which is incorporated herein by reference. It should be noted, however, that the present invention is adapted for cutting any wire rope or cable, although particularly adapted for such post tensioning applications.

Figure 2:
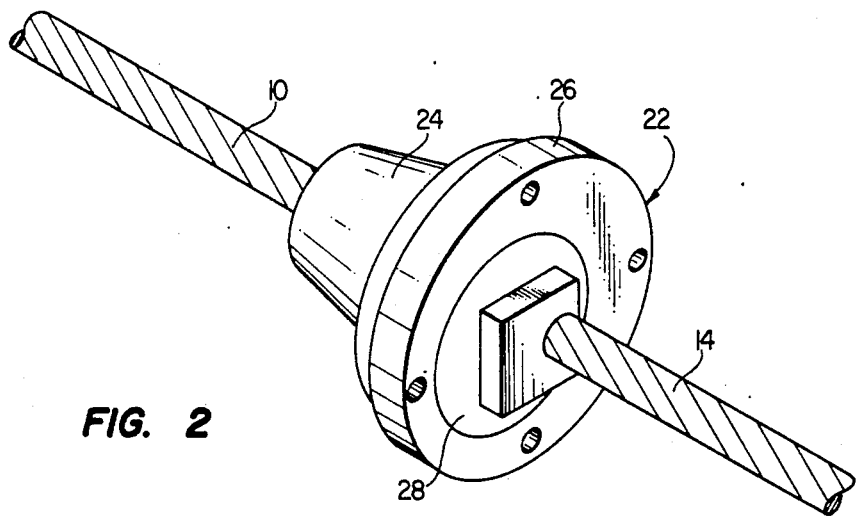
FIG. 2 is a perspective view of one embodiment of a cable shear assembly constructed in accordance with the principles of the present invention.

Referring now to FIG. 2 there is shown a perspective view of a shear cutting block 22 constructed in accordance with the principles of the present invention and adapted for terminating the cable 14 outwardly of the wedge assembly 16 shown in FIG. 1 without the adverse effects normally found in the prior art. This is effected by a "cold shear" as described below. The shear block assembly 22 comprises a conical frontal head 24 which is adapted for being received within the conical side walls of the pocket 18. A cylindrical housing 26 is disposed therebehind and provides the structural region for housing a rotable cutting block drive 28 disposed therein. The cable 10 is shown to be received within the front end of the frontal cone or head region 24 and outwardly of the cutting block drive 28 as cable section 14. By relative rotation of the cutting drive 28 relative to the housing 26 and the blade within the housing (discussed below), cable sections 10 and 14 will be cold sheared and severed.

Figure 4:
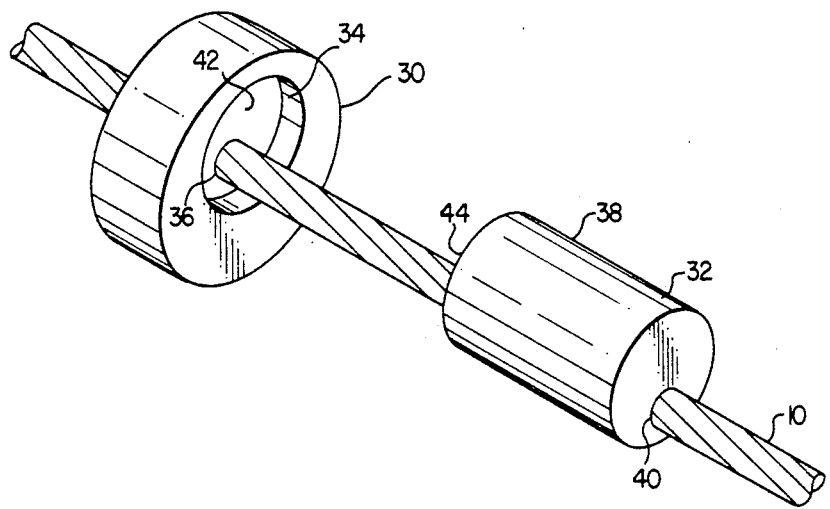
FIG. 4 is a diagrammatic schematic of first and second shear blocks constructed in accordance with the principles of the present invention and utilized for illustrating the method thereof.

Referring now to FIG. 4 there is shown a diagrammatic representation of the eccentric shear block assembly principle incorporated in the present invention. Shown in FIG. 4 is the cable 10 extending through a first cylindrical block 30 and a second eccentric cylindrical block 32. The cylindrical block 32 was constructed for being received in a cylindrical recess 34 formed within the first block 30. Within recess 34 is an aperture 36 formed centrally within the block 30. The recess 34 is however formed eccentric relative to the central aperture 36. The cylindrical body 38 of the block 32 is adapted for being received into rotational engagement with the recess 34, whereby aperture 40 extending therethrough will move in and out of alignment with the central aperture 36. The aperture 40 is eccentrically aligned in the block 32 in mating engagement with the eccentric position of the aperture 36 relative to the recess 34 in this manner the block 32 can be received within the block 30 with the cable 10 extending freely therethrough and upon subsequent rotation a complete eccentric misalignment between the apertures 36 and 40 will occur. With sufficient rotational and axial pressure exerted between respective blocks 30 and 32, the eccentric misalignment of said apertures will cause severing of the cable 10. It is this principle upon which the present invention operates as shown in more detail below.

Figure 3:
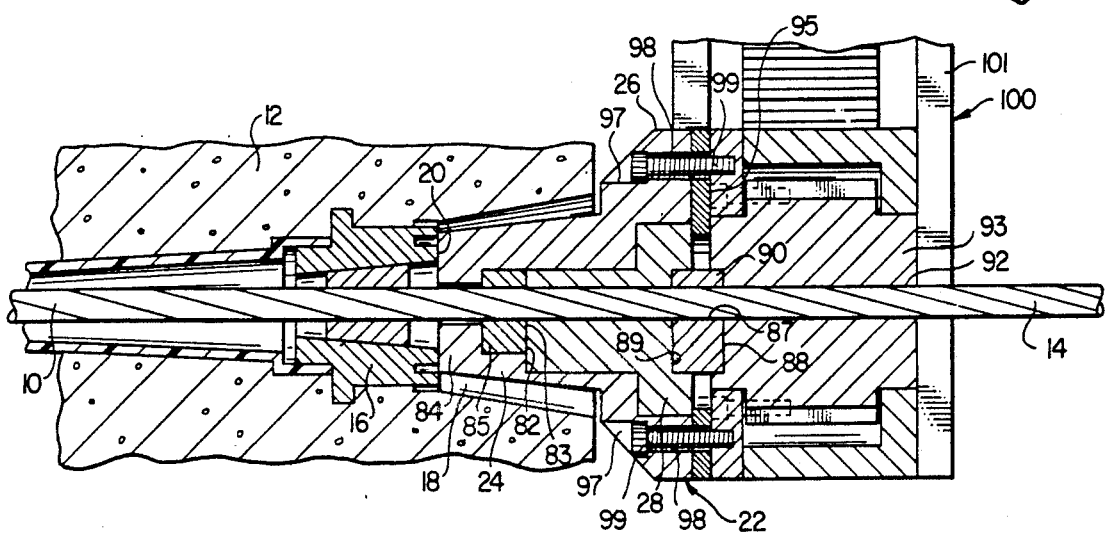
FIG. 3 is an enlarged side-elevational, cross-sectional view of the cable shear assembly of FIG. 2 mounted to a drive system and positioned adjacent the concrete formation.

Referring now to FIG. 3 there is shown an enlarged side-elevational, cross-sectional view of the shear block assembly 22 of FIG. 2 with an associated drive means assembled therewith in accordance with the principles of the present invention. Any number of drive means would be possible, including mechanical, electrical and hybrids thereof. The advantage of the hydraulic variety is the ability to use the same hydraulic pump used to stress the cable. In this particular view the orientation of the assembly 16 is reversed relative to that shown in FIG. 1. The concrete structure 12 is presented to the left of the drawing while the shear block assembly 22 is presented to the right of the drawing. The cable 10 thus extends through the wedge members 17 and outwardly through the pocket region 18 into the conical head 24 of the shear block assembly 22. The face 20 of the assembly 16 is shown to abut the frontal surface of the conical head 24. The conical region 24 is shown to be matingly received within the tapered region of the conical recess 18 to permit sufficient inter-engagement and close proximity for a cut of the cable 10 at the precise location for eliminating an extensive cable region outwardly thereof and permitting close enclosure of the terminated cable section by capping, grouting, or the like shown in the aforesaid co-pending patent application of applicant. Likewise, the length of the cut can be selectively varied to provide different lengths of remaining cable.

Still referring to FIG. 3, the shear block assembly 22 is shown secured to drive system 100 comprising a rack and pinion assembly 101 adapted for imparting relative rotation between the housing 26 and the member 28. Other drive assemblies may, of course, be used. The housing 26 is secured to the drive assembly 100 by means of a plurality of threaded fasteners members or bolts 99 extending therebetween. Each bolt is received within an aperture 98 having a counter-sunk head 97 facilitating the positioning thereof. A bearing or pressure plate 95 is sandwiched against the adjacent back sides of housing 26 and member 28 and the frontal surface of drive gear 93 which faces said back sides. Drive gear 93 is constructed with a central aperture 92 formed therethrough adapted for receipt of the cable 14 therein and extending from the member 28. An engaging block or dog 90 interconnects the drive gear 93 and the member 28. This assembly is effected by the formation of a recess 89 formed in the drive member 28 and a mating recess 88 formed in the drive gear 93. The dog 90 is constructed in the present embodiment of a generally square configuration which is matingly received within each of the recesses 88 and 89. In this manner the rotation of the gear 93 is coupled directly to the member 28 for rotation thereof. However, the dog 90 can break to relieve pressure in the event of jamming. It may be seen that an aperture 87 is formed eccentrically through the dog 90 to facilitate the passage of the cable 14 therein. This off-center and center alignment is described above. The centered and off-centered or eccentric alignment of the apertures through the myriad of assembled elements described above permits the selective alignment and misalignment of the cable 14 through the shear block 22. It should be noted that during rotation of the gear 93, the dog 90 and member 28, the relative cable position therein does not vary as it extends centrally through the housing 26 and centrally through the drive gear 93. It is the eccentric misalignment of the cutting members and apertures in the frontal portion of the cone 24 which is positioned adjacent the securing wedges 17 that provides for the actual cutting. This shearing action is directly facilitated by the placement of a blade on cutting block 85 in the frontal most region 84 of the cone section 24. This particular cutting block 85 is formed of hardened steel with an eccentric aperture formed therethrough as shown in FIG. 3. It comprises a blade in the sense that it can be replaced and provides a surface against which the cable is sheared. Likewise, the bore or recess region within the cone section 24 adapted for receiving the cutting block 85 is eccentric relative to the central line of the housing 26. This eccentric positioning of the cutting block as well as the eccentric hole location therein prevents its rotation relative to the rotation of the drive member 28. As drive member 28 rotates, its frontal surface 83 is maintained in an abutting relationship with the back surface 82 of the cutting block 85. The cutting block 85 is secured within the cone section 24 and cannot move rotationally relative thereto due to the eccentric recess formed therein and its locked inter-engagement therewith. Therefore, the rotation of the drive member 28 imparts eccentric misalignment between the apertures in frontal surface 83 of drive member 28 and the rear surface 82 of the cutting block 85 causing the shearing and cutting action. This action which is imparted by the rotation of the drive gear 93 and interconnecting dog 90 is induced in the present embodiment by the rack and pinion assembly described in more detail below. It may be seen in FIG. 3 that the rack is mounted integrally with the drive assembly 100 wherein the gear 93 is housed. It may also be seen that the gear 93 is secured within said housing in a manner preventing its axial movement during rotation, which axial movement could permit the creation of a space between the cutting surfaces 82 and 83 of the cutting block 85 and drive member 28, respectively. Such a space would reduce cutting-effectiveness. It is the effective alignment, select misalignment and axial securement during rotational positioning of these various members, as described herein, which provides the multitudes of advantages and the efficiency of the present invention.

Figure 5:
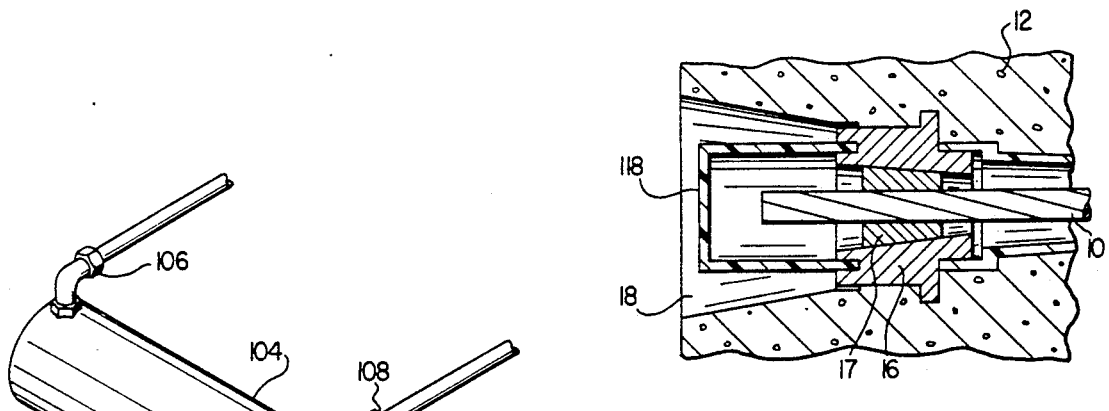
FIG. 5 is an enlarged perspective view of the cable shear assembly and drive system of the present invention with a cable shown positioned therein.

Referring now to FIG. 5 there is shown the shear block assembly 22 and drive system 100 coupled to a rack and pinion drive 101. The rack and pinion drive 101 includes a rack 102 and the pinion of gear 93 shown in FIG. 3. The rack and pinion drive system is powered a hydraulic cylinder 104 having connecting lines 106 and 108 provided for the full hydraulic actuation of the rack 102. The connecting shaft or ram 110 couples the hydraulic actuation to the hydraulic cylinder to the rack 102. Side frames 112 and 114 comprise the sides of the rack 102 with the base member 116 disposed therebeneath and upon which the rack is permitted to slide. Side frames 112 and 114 and bottom 116 are secured to the hydraulic cylinder 104 by conventional means whereby relative movement may be imparted therebetween by the flow of hydraulic fluid. As stated above, hydraulic fluid is conventionally used to stress the cables and the hydraulic cylinder 104 may be powered by the same hydraulic pump (not shown) used for the construction operation.

Still referring to FIG. 5 the shear assembly 22 is shown with the cable 10 disposed therein and extending outwardly therefrom as cable 14. During the shearing operation, the cable 14 will be severed from the cable section 10. In operation it would protrude from a concrete section 12 as shown in FIGS. 1 and 3 above. To effect the actuation, the side frames 112 and 114 are secured directly to the side frame plates 118 and 120.

The side frame 118 and 120 are bolted to the side frames 112 and 114, respectively, by appropriate threaded fasteners to secure and sandwich said drive system 100 therein and drive engagement with the rack 102. With this engagement, actuation of the hydraulic cylinder 104 causes movement in the direction of the arrow 122 and/or in the opposite direction (not shown). This movement imparts the rotation of gear 93 described above (relative to the illustration of FIG. 3) and the eccentric misalignment between the cutting faces described above.

Figure 6:
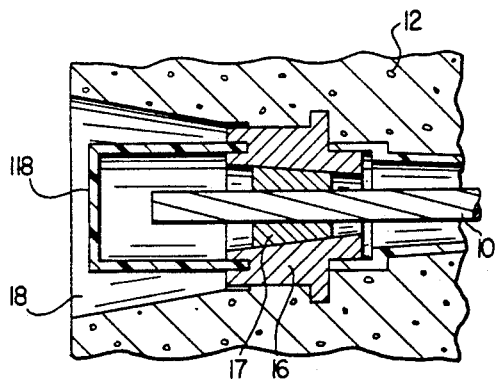
FIG. 6 is a side-elevational, cross-sectional view of the post-tensioning tendon and anchor plate assembly of FIG. 1 after termination of the tendon with the cable shear assembly of the present invention.

In operation, this assembly can be positioned contiguous a concrete slab 12 in mating engagement with the pocket region 18 formed therein. The cable 14 extending therethrough may be terminated to a precise length, which length is established by the thickness of the head region of the cone section 24 and the thickness of the cutting block 85. This length is preferably less than the depth Of the pocket 18 and is sufficiently short to permit grouting or the positioning of a covering cap member 118 thereover as shown in FIG. 6. Such a cap is also shown in U.S. Pat. application Ser. No. 7/088,795, referenced above and incorporated herein by reference.

The cable shear device of the present invention has been shown to be effective in completing a cold shear of cable and wire ropes. In effect, any tendon may be severed by the eccentric misalignment shearing device of the present invention. This shearing device has been shown to be operable through a hydraulic drive system, but it is again pointed out that any number of drive systems may be utilized, depending on the particular application. With post-tensioning structures, the presence of hydraulic systems for the tensioning of the cables renders the utilization of an hydraulic system one of the more efficient approaches. In addition, the shape of the frontal region of the housing, the conical configuration, is designed to permit mating engagement with the standard conical pocket shape conventionally found in post-tension walls. By varying the thickness of the frontal region of the conical section, the precise dimension of the main tendon section can be accurately controlled. Likewise, any changes in this dimension may be imparted to vary the precise dimension of the main tendon. The shearing device of the present invention may also be used at any angular position, including vertical, horizontal or one therebetween. This is particularly useful in construction applications. The assembly, although formed of steel and other relatively heavy materials, can be assembled in a relatively lightweight configuration relative to other constructional tools. An assembly constructed in accordance with the present invention has been constructed with a weight of under 40 pounds, allowing the device to be handled easily on construction jobs. As recited above, the utilization of the cable shear of the present invention eliminates the need for cutting torches and the like which impart the myriad of problems referenced above.

Having described the invention in connection with certain specific embodiments thereof, it is to be understood that further modifications may now suggest themselves to those skilled in the art and it is intended to cover such modifications as fall within the scope of the appended claims.

I claim:

1. A shear block assembly for cutting cable extending outwardly of a post tensioning concrete formation, said assembly comprising:

a housing having an eccentrically positioned recess formed therein, said recess having a generally cylindrical crosssectional configuration;

a generally cylindrical block adapted for being received within said cylindrical, eccentric recess formed within said housing;

said housing being constructed with a central aperture formed therethrough, said aperture opening into said eccentric recess at an off-centered position therein;

said cylindrical block being constructed with an aperture formed therethrough, said aperture being formed in an off-centered position therein for alignment with said aperture opening into said recess of said housing in a first positionable mode whereby a cable may be received therethrough;

means for positioning said housing adjacent said formation in receipt of said cable extending outwardly thereof;

means for imparting relative rotation between said block and said housing whereby said aperture of said block may be positioned out of registry with said recess of said housing for terminating said cable at a select location therealong; and said cables extending outwardly from said formation comprising post tensioning cables, said formation having a pocket formed therein for exposing said cable extending outwardly thereof, and said housing having a frontal region formed of a generally conical configuration adapted to be matingly received within said pocket.

2. The apparatus as set forth in claim 2 wherein said conical portion of said housing has an aperture formed therethrough in a generally axial relationship therewith.

3. The apparatus as set forth in claim 1 wherein said assembly further includes a cutting blade adapted for being received between said cylindrical block and said recess of said housing, said blade having an aperture formed therethrough for receiving said cable and providing a cutting surface against which said cable may be sheared during relative rotation between said block and said housing.

4. The apparatus as set forth in claim 1 wherein said means for imparting relative rotation between said block and said housing comprises hydraulic drive means adapted for rotating said block relative to said housing.

5. A shear block assembly for cutting cable extending outwardly of a formation, said assembly comprising:

a housing having an eccentrically positioned recess formed therein, said recess having a generally cylindrical cross-sectional configuration;

a generally cylindrical block adapted for being received within said cylindrical, eccentric recess formed within said housing;

said housing being constructed with a central aperture formed therethrough, said aperture opening into said eccentric recess at an off-centered position therein;

said cylindrical block being constructed with an aperture formed therethrough, said aperture being formed in an off-centered position therein for alignment with said aperture opening into said recess of said housing in a first positionable mode whereby a cable may be received therethrough;

means for positioning said housing adjacent said formation in receipt of said cable extending outwardly thereof;

means for imparting relative rotation between said block and said housing whereby said aperture of said block may be positioned out of registry with said recess of said housing for terminating said cable at a select location therealong; and a pressure plate positioned against said block and said housing for preventing relative axial movement therebetween during relative rotational movement.

6. The apparatus as set forth in claim 5 wherein said means for imparting relative rotation between said block and said housing comprises a rack and pinion assembly positioned adjacent said pressure plate for sandwiching said pressure plate between said pinion and said housing and block assembly.

7. The apparatus as set forth in claim 6 including a drive member positioned between said block and said pinion and in engagement therewith for providing a drive connection therebetween and wherein said pressure plate includes an aperture formed therethrough for permitting the positioning of said drive member therein.

8. A shear block assembly for cutting cable extending outwardly of a formation, said assembly comprising:

a housing having an eccentrically positioned recess formed therein, said recess having a generally cylindrical cross-sectional configuration;

a generally cylindrical block adapted for being received within said cylindrical, eccentric recess formed within said housing;

said housing being constructed with a central aperture formed therethrough, said aperture opening into said eccentric recess at an off-centered position therein;

said cylindrical block being constructed with an aperture formed therethrough, said aperture being formed in an off-centered position therein for alignment with said aperture opening into said recess of said housing in a first positionable mode whereby a cable may be received therethrough;

said housing further having a generally conically shaped frontal region adapted for matingly engaging a pocket formed in said formation, a cutting blade adapted for being received within said recess of said housing adjacent said block, said blade having an aperture formed therethrough in an eccentric position therewith for being positioned within said recess for receipt of said cable therethrough;

means for positioning said housing adjacent said formation in mating engagement with said pocket and in receipt of said cable extending outwardly thereof; and means for imparting relative rotation between said block and said housing whereby said aperture of said block may be positioned out of registry with said recess of said housing for terminating said cable at a select location therealong.

9. A shear block assembly for the cold shear of a tendon comprising:

a housing having an eccentrically positioned recess formed therein with an aperture formed therethrough;

a generally cylindrical block adapted for being received within said recess and having an aperture formed therethrough adapted for positioning in registry with said aperture of said housing in a first positionable mode;

means for imparting relative rotation between said block and said housing whereby said aperture of said block may be positioned out of registry with said aperture of said housing in a second positionable mode;

means for maintaining the axial relationship between said block and said housing during said relative rotation therebetween for effecting cold shear of said tendon extending through said apertures thereof whereby said tendon may be terminated at a select location therealong; and said tendon being disposed in a post-tensioning concrete formation with said tendons extending outwardly therefrom, said formation having a pocket formed therein for exposing said tendon extending outwardly thereof, and said housing having a frontal region formed of a generally conical configuration adapted to be matingly received within said pocket.

10. The apparatus as set forth in claim 9 wherein said conical portion of said housing has an aperture formed therethrough in a generally axial relationship therewith.

11. The apparatus as set forth in claim 9 wherein said assembly further includes a cutting blade adapted for being received between said cylindrical block and said recess of said housing, said blade having an aperture formed therethrough for receiving said tendon and providing a cutting surface against which said tendon may be sheared during relative rotation between said block and said housing.

12. The apparatus as set forth in claim 9 wherein said means for imparting relative rotation between said block and said housing comprises hydraulic drive means adapted for rotating said block relative to said housing.

13. A shear block assembly for the cold shear of a tendon comprising:

a housing having an eccentrically positioned recess formed therein with an aperture formed therethrough;

a generally cylindrical block adapted for being received within said recess and having an aperture formed therethrough adapted for positioning in registry with said aperture of said housing in a first positionable mode;

means for imparting relative rotation between said block and said housing whereby said aperture of said block may be positioned out of registry with said aperture of said housing in a second positionable mode;

means for maintaining the axial relationship between said block and said housing during said relative rotation therebetween for effecting cold shear of said tendon extending through said apertures thereof whereby said tendon may be terminated at a select location therealong; and said block further including a pressure plate positioned against said block and said housing for preventing relative axial movement therebetween during relative rotational movement.

14. A shear block assembly for the cold shear of a tendon comprising:

a housing having an eccentrically positioned recess formed therein with an aperture formed therethrough;

a generally cylindrical block adapted for being received within said recess and having an aperture formed therethrough adapted for positioning in registry with said aperture of said housing in a first positionable mode;

means for imparting relative rotation between said block and said housing whereby said aperture of said block may be positioned out of registry with said aperture of said housing in a second positionable mode said means comprising a rack and pinion assembly positioned adjacent said pressure plate for sandwiching said pressure plate between said pinion and said housing and block assembly; and means for maintaining the axial relationship between said block and said housing during said relative rotation therebetween for effecting cold shear of said tendon extending through said apertures thereof whereby said tendon may be terminated at a select location therealong.

15. The apparatus as set forth in claim 14 including a drive member positioned between said block and said pinion and in engagement therewith for providing a drive connection therebetween and wherein said pressure plate an aperture formed therethrough for permitting the positioning of said drive member therein.

16. A method for the cold shear of a tendon extending outwardly of a pocket formed in a post tensioning concrete formation comprising:

providing a housing having an eccentrically positioned recess formed therein with an aperture formed therethrough and constructed with a frontal region formed of a generally conical configuration adapted to be matingly received within said pocket;

providing a generally cylindrical block having an aperture formed therethrough adapted for positioning in registry with said aperture of said housing in a first positionable mode;

receiving said block within said recess of said housing;

receiving said tendon through said apertures of said block and housing;

positioning said frontal region of said housing within said pocket;

imparting relative rotation between said block and said housing whereby said aperture of said block may be positioned out of registry with said aperture of said housing in a second positionable mode; and maintaining the axial relationship between said block and said housing during said relative rotation therebetween for effecting cold shear of said tendon extending through said apertures thereof whereby said tendon may be terminated at a select location therealong.

* * * * *